United States Patent
Baron

(10) Patent No.: US 10,171,337 B2
(45) Date of Patent: Jan. 1, 2019

(54) METHOD FOR MANAGING A NETWORK, AND NODE FOR IMPLEMENTING SAID METHOD

(71) Applicant: SERCEL, Carquefou (FR)

(72) Inventor: Julien Baron, Carquefou (FR)

(73) Assignee: SERCEL, Carquefou (FR)

( * ) Notice: Subject to any disclaimer, the term of this patent is extended or adjusted under 35 U.S.C. 154(b) by 25 days.

(21) Appl. No.: 15/319,274

(22) PCT Filed: Jun. 16, 2015

(86) PCT No.: PCT/EP2015/063487
§ 371 (c)(1),
(2) Date: Dec. 15, 2016

(87) PCT Pub. No.: WO2015/193322
PCT Pub. Date: Dec. 23, 2015

(65) Prior Publication Data
US 2017/0134259 A1 May 11, 2017

(30) Foreign Application Priority Data

Jun. 17, 2014 (EP) .................................. 14305927

(51) Int. Cl.
*H04L 12/751* (2013.01)
*H04L 12/24* (2006.01)
(Continued)

(52) U.S. Cl.
CPC .......... *H04L 45/02* (2013.01); *H04L 41/0816* (2013.01); *H04L 45/745* (2013.01);
(Continued)

(58) Field of Classification Search
CPC ..... H04L 12/24; H04L 12/741; H04L 12/751; H04L 12/753; H04L 29/08;
(Continued)

(56) References Cited

U.S. PATENT DOCUMENTS 7,039,694 B2 * 5/2006 Kampe ............... H04L 41/0618
709/216
7,120,690 B1 * 10/2006 Krishnan .......... G06F 17/30575
709/225

(Continued)

OTHER PUBLICATIONS

Search Report dated Sep. 10, 2015.
Search Report dated Sep. 29, 2015.

*Primary Examiner* — Tri H Phan
(74) *Attorney, Agent, or Firm* — IPSILON USA, LLP

(57) ABSTRACT

There is provided a method for electing a master routing node of a given subnet of a network, comprising: determining (71) a first-type address associated with an interface of each node on the given subnet, and being the address given by a routing table of the next hop (router node or target node) on the path leading from the node to a target node; determining (72) a second-type address associated with the interface of each node on the given subnet, and being either the determined first-type address (if the latter is on the given subnet) or the address of the interface of the node on the given subnet (if the determined first-type address is on another subnet); sending (73) by each router node of the given subnet a message containing its determined second-type address; collecting (74) at the interface of each node on the given subnet the sent messages; selecting (75) for the interface of each node on the given subnet a third-type address among its determined second-type address and the second-type addresses contained in the collected messages, according to a selection rule known by all nodes of the subnet; electing (76) as master routing node of the given subnet the node having the selected third-type address.

18 Claims, 3 Drawing Sheets

(51) Int. Cl.
  *H04L 12/741* (2013.01)
  *H04L 29/08* (2006.01)
  *H04L 12/26* (2006.01)

(52) U.S. Cl.
  CPC .............. *H04L 67/12* (2013.01); *H04L 41/12* (2013.01); *H04L 43/0817* (2013.01)

(58) Field of Classification Search
  CPC . H04L 41/0816; H04L 41/12; H04L 43/0817; H04L 45/02; H04L 45/745; H04L 67/12
  See application file for complete search history.

(56) References Cited

U.S. PATENT DOCUMENTS

| | | | |
|---|---|---|---|
| 7,269,648 B1 * | 9/2007 | Krishnan | G06F 17/30575 707/E17.032 |
| 7,461,130 B1 * | 12/2008 | AbdelAziz | H04W 84/20 709/208 |
| 7,852,788 B2 * | 12/2010 | Mohamed-Rasheed | H04L 41/12 370/254 |
| 8,560,626 B2 * | 10/2013 | Nelson | H04L 41/04 709/201 |
| 9,438,479 B1 * | 9/2016 | Friedman | H04L 45/54 |
| 2005/0071381 A1 * | 3/2005 | Rosenstock | H04L 67/1095 |
| 2006/0256733 A1 | 11/2006 | Bejerano | |
| 2010/0148940 A1 * | 6/2010 | Gelvin | G08B 9/00 |
| 2012/0079580 A1 * | 3/2012 | Johnsen | H04L 12/462 726/7 |
| 2013/0132536 A1 * | 5/2013 | Zhang | G06F 15/177 |
| 2015/0188808 A1 * | 7/2015 | GhanWani | H04L 45/42 |

\* cited by examiner

METHOD FOR MANAGING A NETWORK, AND NODE FOR IMPLEMENTING SAID METHOD

RELATED APPLICATIONS

This application is a National Phase Application of PCT/FR2015/063487 filed on Jun. 16, 2015, which in turn claims the benefit of European Patent Application No. 14 305 927.7, filed on Jun. 17, 2014, the entirety of which are incorporated herein by reference.

FIELD OF THE INVENTION

The field of the present invention is that of communication networks.

More specifically, the invention deals with a solution for managing a network comprising a plurality of subnets.

The present invention can be applied notably, but not exclusively, to the (cabled or wireless) communication network of a seismic data acquisition system. To collect geophysical data, the principle of operation of a seismic data acquisition system is as follows: for a given seismic survey, one or several seismic sources (explosives, falling weights, vibrators, air guns, etc.) are activated to propagate omnidirectional seismic wave trains; the wave trains reflected by the layers of the subsurface are detected by seismic sensors, which generate a signal characterizing the geological interfaces of the subsurface. A map of the prospected subsoil can be constructed after processing the reflected wave trains. The seismic data acquisition can be applied notably to the oil exploration industry.

In the description below, we consider the following generic terminology:
- a network comprises a plurality of network nodes;
- each network node comprises at least one interface enabling to connect the node to a distinct subnet, preferably at least two (e.g. a first and a second interface enabling to connect the node to a first and a second subnet respectively). Each interface comprises one or several ports;
- a router node is a node having at least two interfaces activated (i.e. a node connected simultaneously to at least two subnets);
- a non-router node is a node having only one interface activated (i.e. a node connected to only one subnet);
- the status (router or non-router) of a node may change over time;
- each subnet comprises nodes connected together by a same type of interface;
- via the router nodes, several subnets can be connected (coupled) together in a cascade configuration, thus defining successive levels of subnets.

PRIOR ART

It is sought more particularly here below in this document to describe problems existing with the communication network of a seismic data acquisition system. The invention of course is not limited to this particular application but is of interest for any communication network that has to cope with closely related or similar issues and problems.

Typically, and as shown in the example of FIG. 1, a seismic data acquisition system 1 comprises a network connected to a master central unit 4 which controls all the devices of said system and centralizes the data transmitted in said network. The network comprises a plurality of concentrators 2,3 (i.e., according to the aforesaid generic terminology, "network nodes", e.g. having an IP address) communicating with the master central unit 4 and distributed along two types of subnets, which may be referred to as "lines" (e.g. wired lines, even if wireless "lines" can be envisioned): sensor lines 5,5' (also referred to as "acquisition lines") and backbone lines 6,6' (also referred to as "transverse lines").

The use of sensor lines 5,5' and backbone lines 6,6' creates loops and allows seismic data to be transmitted through multiple paths. This topography with loops may avoid losing data due to cable cuts.

The master central unit 4 collects all the seismic data from seismic sensors 9, via data acquisition units 8 and the concentrators 2,3. The data acquisition system 1 may be used on land or at sea (in the second case, the master central unit 4 is generally on board a ship).

Each data acquisition unit 8 is associated with at least one seismic sensor 9. The data acquisition units 8 process signals transmitted by the seismic sensor(s) 9 and generate seismic data. The sensors 9 are either analog sensors or digital sensors. When analog sensors (also referred to as "geophones" for land application) are used, they are generally interconnected by cables to form clusters referred to as "strings of geophones" 7. One or several of these strings of geophones (in series or in parallel) are connected to each data acquisition unit 8 (which, in this case, is also referred to as FDU, for "Field Digitizing Unit") and this latter performs an analog to digital conversion of the signal from the groups of geophones and send these seismic data to the master central unit 4 (via the concentrators 2,3). When digital sensors are used (e.g. micro-machined accelerometers, also referred to as "MEMS-based digital accelerometer"), they are often integrated in the data acquisition units 8 (which, in this case, are also referred to as DSUs, for "Digital Sensor Units").

A given sensor line 5 comprises one or several concentrators 2,3 assembled in series along with data acquisition units 8 and connected together by their sensor line interface. A set of data acquisition units 8 connected to a concentrator 2,3 at least at one end is called a "segment". In other words, a segment is a portion of a sensor line 5 and comprises a set of data acquisition units 8 and one or two concentrators 2,3 at its extremities. Each concentrator 2,3 locally manages communication on a segment, supplies power to the data acquisition units 8 of this segment and receives seismic data generated by the data acquisition units 8 of this segment.

Each concentrator 2,3 has an activated sensor line 5 interface; some of them 2 do have a second activated backbone line 6 interface and are called router concentrators 2. Note that non-router concentrators 3 may also possess a backbone line interface (thereby being possibly used as router concentrator in another seismic data acquisition system) which however is not activated.

A given backbone line 6 comprises router concentrators 2 assembled in series. In other words, a backbone line 6 is defined as a second type of subnet comprising router concentrators 2 connected together by their backbone line interface. Backbone lines do not comprise data acquisition units 1. They have a high data-rate to rapidly transfer data. The master central unit 4 is connected to at least one of the backbone lines 6.

Since network cables may actually be partially or completely cut due to environmental stresses, thus isolating some portions of some sensor lines, data transmission might be problematic for some nodes (concentrators) 2,3. Moreover, at any time, operators may connect and disconnect cables to install new nodes (concentrators) and/or new lines.

In order to be less sensitive to cable cuts, the data acquisition system could comprise at least two sensor lines 5,5' interconnected by at least a secondary backbone line 6'.

As an example, FIG. 2 shows a block diagram of a concentrator 2,3. Such a device includes a Central Processing Unit (CPU) 10, running a computer program, with, among others, means to run seismic acquisition, read from a program memory 11, and processing data stored in a data memory 12, such as a flash memory or a hard disk drive. The concentrator comprises a first input/output interface ("sensor line interface") 13 (comprising two ports 131,132 in this example) to communicate along the section line 5 with possibly a previous and a subsequent concentrator. The router concentrator 2 may also comprise an input port to receive signals from one or more seismic sensors (not shown). The power supply is provided by an external battery 17 or by an integrated battery. If the concentrator is a router concentrator 2, it comprises also a second input/output interface ("backbone line interface") 18 (comprising two ports 181,182 in this example) for a high data-rate connection with a backbone line 6, allowing rapid transmissions of data to the master central unit 4. According to a preferred embodiment, a non-router concentrator 3 has the same elements as a router concentrator 2, but its second input/output interface ("backbone line interface") 18 is inactive; alternatively, the backbone line interface 18 is not present.

In practice, the complexity of the communication network is often high. Indeed, the network 1 comprises many subnets, with concentrators 2,3 connected to a great number of data acquisition units 8.

In practice, the seismic sensors 9, data acquisition units 8 and concentrators 2,3 are turned off when they are placed on the ground and connected to the data acquisition system 1. The activation of each unit is successively performed by the propagation of an electric voltage signal on the sensor line.

For most systems according to the prior art, the orientation of data transmission towards the master central unit 4, for each segment of a sensor line 5,5', is defined by the power supply orientation during network initialization. Indeed, when (according to the content of a routing table) a first concentrator located at one end of a segment turns on the devices of this segment (i.e. the data acquisition units 8 of this segment and, if any, a second concentrator located at the other end of the segment), all these devices will send their data to the first concentrator (referred to as "master of the segment"). In other word, the segment is "oriented" towards the first concentrator. By repeating this operation, from concentrator to concentrator, we can define the orientation of all segments of all sensor lines.

A drawback of this known solution is that the orientation of data transmission is static and cannot change between two network starts (initializations). Any network topology change is associated with a time consuming restart of the system.

Another drawback of this known solution is that it has to be adapted in case the network comprises one or several loops (as shown for example in FIG. 1). Indeed, with the presence of a loop (two backbone lines connected to two sensor lines), two orientations of data transmission can be defined for the sensor lines (depending on whether or not the second backbone line 6' is used). In other words, for each concentrator of a sensor line 5,5' involved in the loop, the routing information (used for defining the power supply orientation) should specify only one path towards the master central unit 4.

The aforesaid drawbacks are even more troublesome in case of segments having asymmetric bandwidths. Indeed, it might be of interest that a sensor line 5,5' uses a Half Duplex bi-directional protocol. The amount of command signal data (from the master central unit 4) is much smaller than the amount of seismic measurements data (towards the master central unit 4). Therefore, it might be preferred that the bandwidth allocated to transmit command signal data from the master central unit 4 to the concentrators 2,3 ("UP" communications) is smaller than the bandwidth allocated to transmit data from the concentrators to the master central unit ("DOWN" communications). For example, as shown in FIG. 4 for each segment $5_1, 5_2$ of the line 5, "UP" communications would represent 10% of the total bandwidth and "DOWN" communication 90%, with an asymmetry of bandwidth in a ratio of 1 to 10. The time intervals are for example of 1 millisecond to receive command signals up to 500 bytes from the master central unit, and of 9 milliseconds to send measurements data up to 4500 bytes. Unfortunately, in some cases and as illustrated in FIG. 4, a mixing of the orientation of the segments $5_1, 5_2$ of the line 5 results in leveling the throughput of the whole line to the lower bandwidth (10%) in both directions, as shown by the arrows referenced 41 and 42, thereby affecting the whole line transmission. A situation with segments of a same line having opposite directions may exist for example in case a topology change occurs.

GOALS OF THE INVENTION

The invention, in at least one embodiment, is especially aimed at overcoming some drawbacks of the prior art.

More specifically, it is a goal of at least one embodiment of the present invention to dynamically determine the orientation of data transmission from any node towards a target node of a network comprising a plurality of subnets (e.g. the orientation of data transmission from any concentrator towards a master central unit of a seismic data acquisition network), even if the network comprises one or several loops.

It is another goal of at least one embodiment of the invention to provide a solution that doesn't require a restart of the network in case of topology change.

It is another goal of at least one embodiment of the invention to provide a solution that can be implemented with a network comprising subnets with segments having asymmetric bandwidths.

It is another goal of at least one embodiment of the invention to provide a solution that is easy to implement on the field with minimal cost.

It is another goal of at least one embodiment of the invention to provide a solution that allows, in a decentralized and dynamic way, to elect a single master routing node for a subnet.

It is another goal of at least one embodiment of the invention to use the knowledge of the aforesaid single master routing node of a given subnet, to implement a data transmission within the given subnet.

LIST OF FIGURES

Other characteristics and advantages of the invention will be further appreciated upon consideration of the following detailed description of embodiments taken in conjunction with the appended figures, which represent:

FIG. 1, already described, shows a first example of a data acquisition system comprising a cabled communication network with a loop;

FIG. 2, already described, shows a concentrator according to a preferred embodiment;

FIG. 3 shows an example of network without loop;

FIG. 4, already described, represents a non-homogeneous orientation of data transmission in several concentrators connected to a sensor line (i.e. segments of a same line having opposite directions) and its consequence;

DESCRIPTION OF A PREFERRED EMBODIMENT

Identical elements are referenced in the same manner throughout all the figures of the present document.

Figure 3:
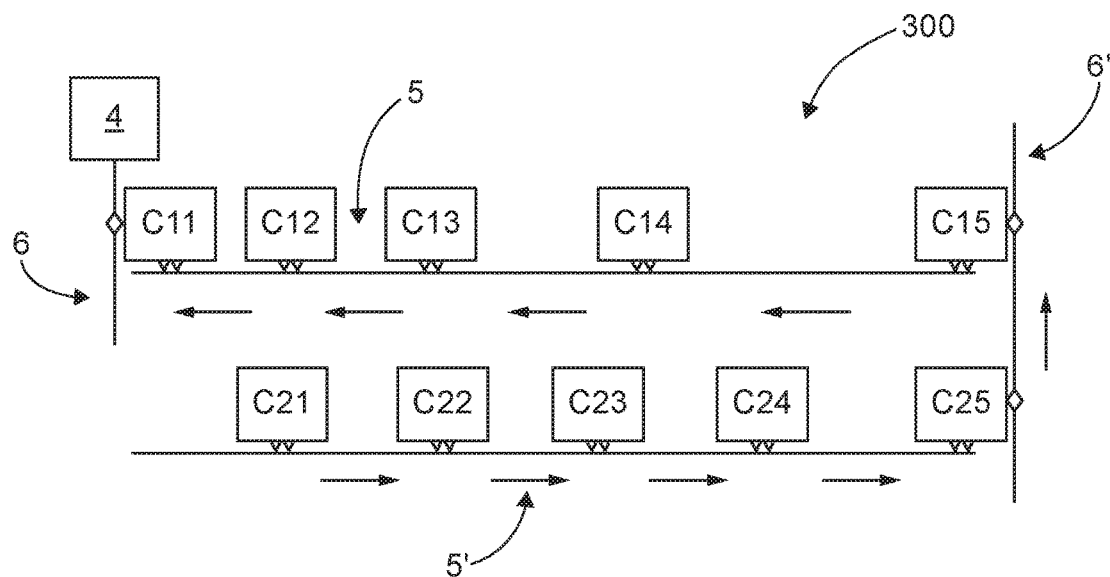

FIG. 3 shows an example of seismic data acquisition network 300 without loop. The network 300 comprises ten concentrators, five connected to a first sensor line 5: C11, C12, C13, C14 and C15, and five connected to a second sensor line 5': C21, C22, C23, C24 and C25. To avoid overloading the figure, the data acquisition units 8 and the seismic sensors 9 discussed above (see FIG. 1) are not shown.

In a preferred embodiment of seismic data acquisition, the concentrators periodically retrieve seismic and quality control datasets from data acquisition units and sensors, and transmit them to a target node of network 300, here the master central unit 4, using the communication information extracted from the routing tables.

The communication network 300 does not comprise loop, the path for transmitting data from any concentrator to the master central unit 4 being unique and represented by arrows. Take for example the farthest concentrator C21: its data go along the sensor line 5' to the router concentrator C25 (via the concentrators C22, C23 and C24), then along the backbone line 6' to the router concentrator C15, then along the sensor line 5 to the router concentrator C11 (via concentrators C14, C13 and C12), and finally along the main backbone line 6 to the master central unit 4.

In this simple network, a routing table (e.g. filled with a dynamic routing protocol also used in IP network) defines communication rules such that assignment of the transmission orientation can be easily managed by the concentrators.

Each concentrator queries the routing table to determine the path to reach the master central unit 4. In the example of FIG. 3, we assume the routing table gives the following information:

for C11: the master central unit 4 is directly connected (on the backbone line 6);

for C12, C13, C14 and C15: the master central unit 4 is accessible via the router concentrator C11 (on the sensor line 5);

for C25: the master central unit 4 is accessible via the router concentrator C15 (on the backbone line 6'); and for C21, C22, C23, C24: the master central unit 4 is accessible via the router concentrator C25 (on the sensor line 5').

As already discussed above, in a first known solution, the orientation of data transmission towards the master central unit 4 is defined by the power supply orientation during network initialization (according to the content of the routing table).

But with this first known solution, the orientation of data transmission is static and cannot change between two network starts (initializations). Any network topology change requires a time consuming restart of the system.

Figure 1:
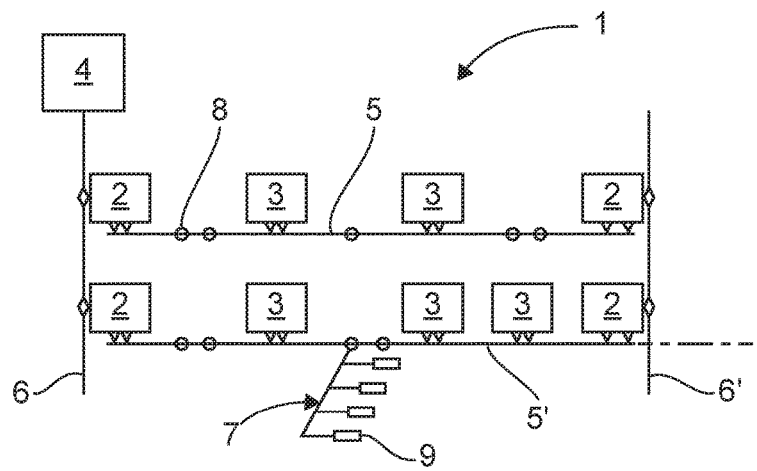
Figure 2:
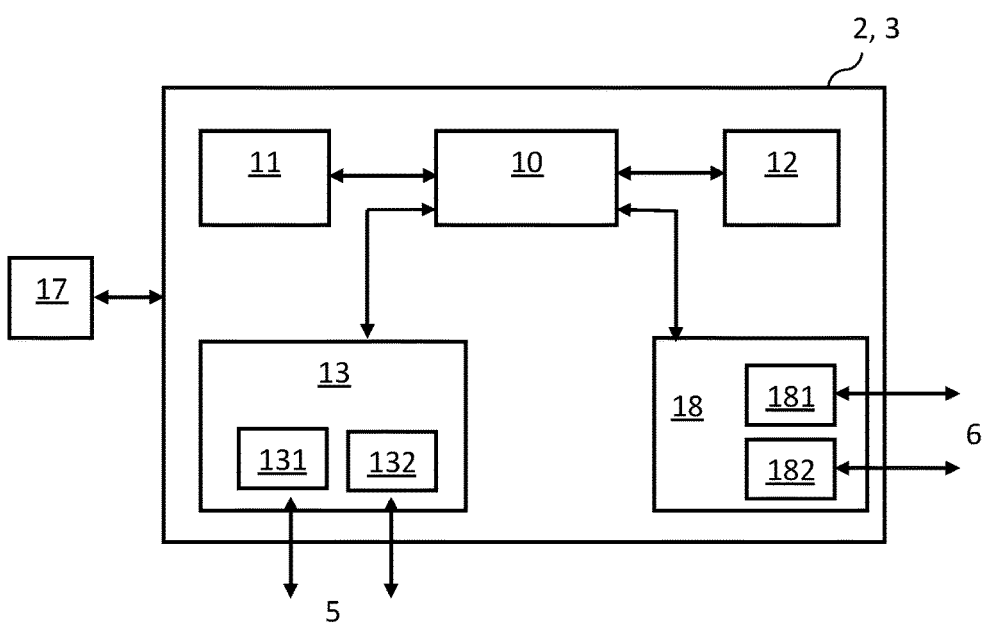

Moreover, in the case of a data acquisition network with a loop, like shown in FIG. 1, the first known solution should be adapted. Indeed, with the presence of a loop (two backbone lines 6,6' connected to two sensor lines 5,5'), two communication orientations can be defined for the sensor lines (making use of 6' or not). For each concentrator of a sensor line 5,5' involved in the loop, the routing information (used for defining the power supply orientation) should specify only one path towards the master central unit 4.

Figure 4:
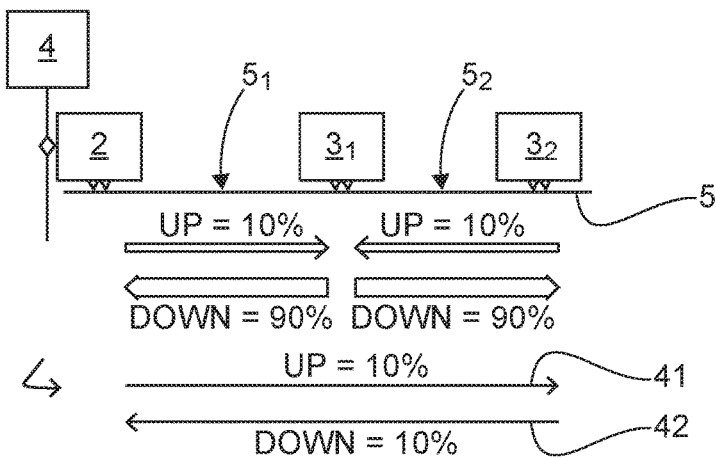

The aforesaid drawbacks of the first known solution are even more troublesome in case of segments having asymmetric bandwidths (i.e. a higher bandwidth in one direction and a lower bandwidth in the other direction) (see above description of FIG. 4).

The present invention can provide a dynamic adaptation to any change in topology of a network (leading to the creation or deletion of loops); it can be applied to a network with one or several loops, as e.g. disclosed in relation with FIG. 1, but also to a network without loop. In the case of a network whose subnets comprise segments having asymmetric bandwidths, present invention moreover prevents the situation shown in FIG. 4 and discussed above from happening.

The network topology shown by FIG. 1 constantly changes depending on the addition and removal of concentrators and line cuts. With the present invention, these changes are taken into account, by sending new information messages along the lines and network, for adapting the orientation of communication, in particular bandwidth, to the new situation.

For purposes of clarity, a particular embodiment of the invention is described below with reference to FIG. 5 (second example of network 500 with a loop) and FIG. 7 (flowchart of a particular embodiment of the method), but the principle of the invention is of course not limited to this example.

Figure 5:
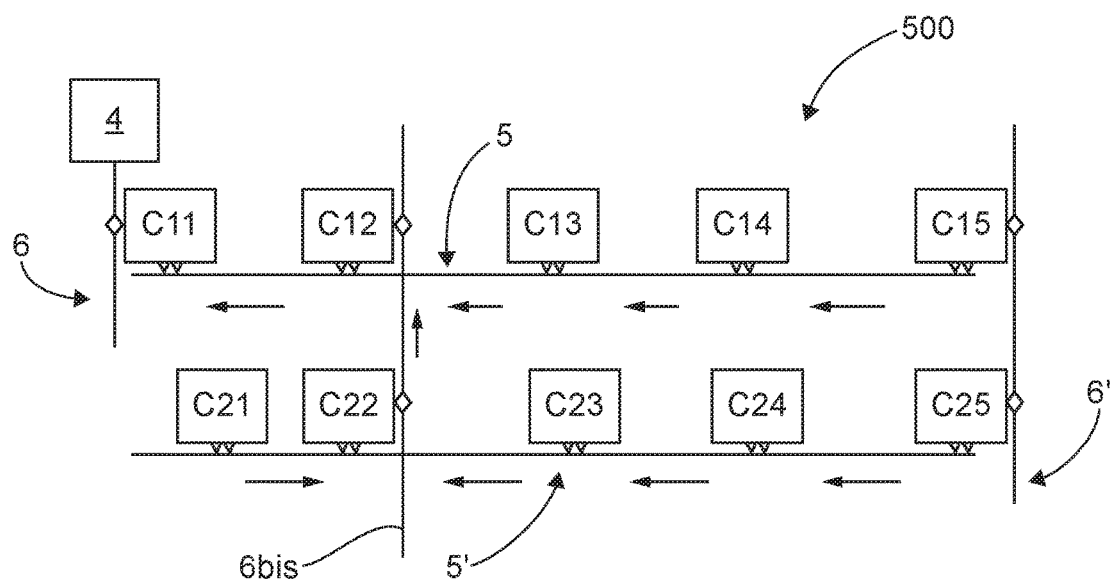
FIG. 5 shows a second example of network with a loop.

FIG. 5 shows a new backbone line 6b is implemented in the network of FIG. 3. Concentrators C12 and C22 are connected to this new backbone line 6b is and are therefore routers. A loop is thereby produced between C12 and C22. The installation of this backbone line 6b is creates another path to the master central unit 4 for the concentrators C21, C22, C23, C24 and C25. Moreover, the orientation of data transmission, illustrated by arrows, is different for concentrators C21, C23, C24 and C25, compared with the case of FIG. 3.

Figure 7:
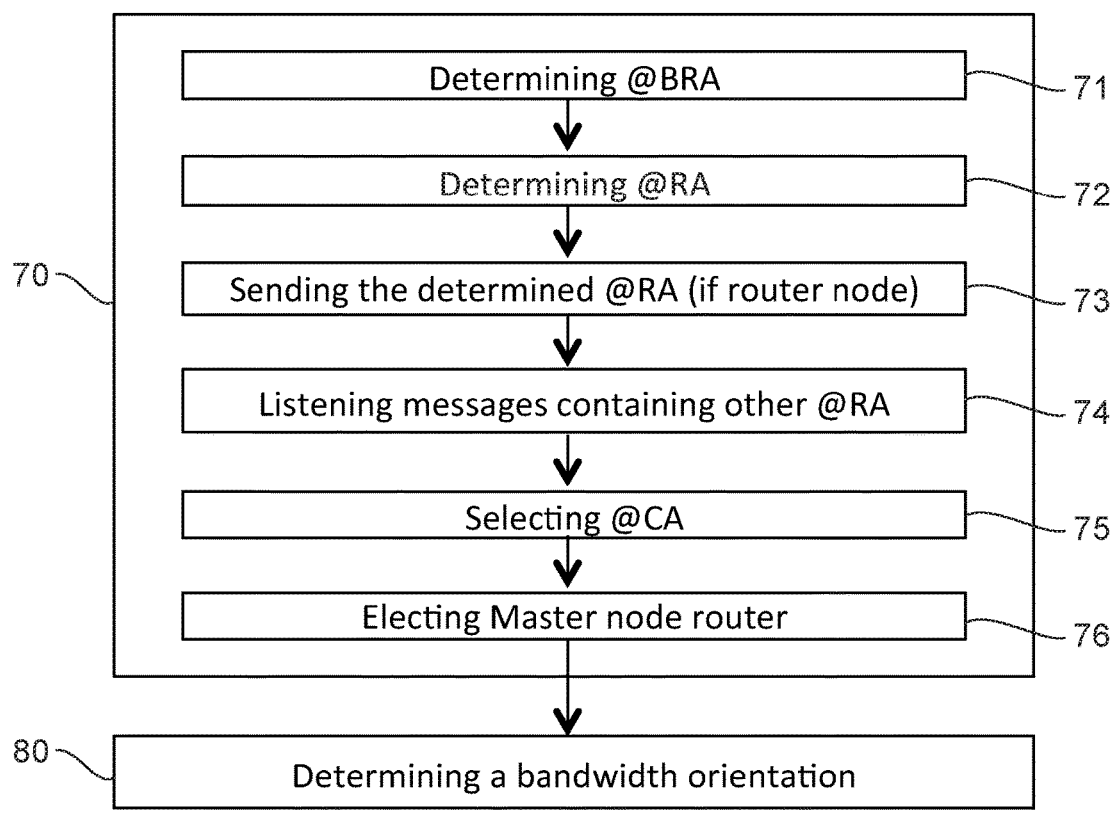
FIG. 7 is a flowchart of a particular embodiment of the method according to the invention.

In the particular embodiment shown in FIG. 7, the method comprises two phases, for each sensor line 5,5': a first phase 70 for electing a master routing node of the sensor line and a second phase 80 for determining a bandwidth orientation for each segment of the sensor line.

The first election phase 70 comprises steps 71 to 76 carried out by each concentrator (node) of a given sensor line (subnet) 5,5'. The results of these steps for the concentrators C11 to C15 (of sensor line 5) and C21 to C25 (of sensor line 5') are shown in the below table A. The addresses discussed below are for example IP addresses.

Step 71: determining a first-type address (referred to as "@BRA" for "BasedRouteAddress") associated with the concentrator and defined as the address, given by a routing table, of the next hop from the concentrator on the path for arriving to the target node of the network 500 (i.e. the master central unit 4 in this example). The next hop leads to a router concentrator (case of C12-C15 and C21-C25) or the master central unit (case of C11).

Step 72: determining a second-type address (referred to as "@RA" for "RoutingAddress") associated with the concentrator and defined as follows: @RA is initialized either with the determined @BRA, if the determined @BRA is on the given sensor line 5,5' (case of C12-C15, C21, C23 and C24), or with the address of the concentrator on the given sensor line (case of C11, C22 and C25).

Step 73: if the concentrator is a router concentrator, sending on the given sensor line a message containing the determined @RA (case of C11, C12, C15, C22 and C25).

Step 74: listening to the given sensor line in order to collect messages each containing a second-type address @RA associated with a router concentrator of the given sensor line (e.g. C14 collects messages from C11 and C15, and C22 collects messages from C25).

Step 75: selecting a third-type address (referred to as "@CA" for "ComputingAddress") among the second-type addresses @RA either determined in step 72 or contained in the messages collected in step 74. The choice is carried out according to a selection rule known by all concentrators. In a particular embodiment, the selection rule consists in selecting the lowest address among all @RA. Alternatively, the highest address is selected, or any other criteria can be used. For example, C25 could be selected even if the path for transmitting data to the master central unit 4 seems longer via C25 than via C22.

In a particular embodiment, step 75 comprises the following sub-steps:
  determining a fourth-type address (referred to as "@NA" for "NetworkAddress") associated with the concentrator and selected among the @RAs collected in step 74 according to the selection rule (e.g. the lowest address: @NA=min(@RAs)). Preferably, the validity of this value @NA has a limited duration, e.g. twice an emission period of the router concentrators in step 73;
  determining @CA by selection among @NA and @RA determined in step 72, according to the determined rule (e.g. the lowest address: @CA=min(@NA, @RA)).

Step 76: electing as master routing node of the given sensor line the router concentrator having the determined third-type address (@CA). As specified in table A, all the concentrators C11-C15 of sensor line 5 elect the same master routing node: C11; and all the concentrators C21-C25 of sensor line 5' elect the same master routing node: C22.

ms) lower than the first period. Alternatively, or in addition, the first phase 70 is carried out on detection of a topology change by addition, deletion or cut of a link between two concentrators (nodes).

When applicable, e.g. for Half-Duplex communication, during the second phase 80 (for determining a bandwidth orientation for each segment of the sensor line 5,5') each concentrator of a given sensor line 5,5' carries out a step of configuring its ports of the activated interface connected to the sensor line as a function of the elected master routing concentrator.

Preferably, the configuration of ports for a concentrator which is not the elected master routing concentrator is achieved as follows: each port 131, 132 of the activated interface 13 connected to the given sensor line 5,5', except the one through which the concentrator can communicate with the master router concentrator, is configured as receiving with the higher bandwidth and transmitting with the lower bandwidth. The port which can communicate with the master routing concentrator can be configured the opposite (higher bandwidth for transmission), or it can be indirectly configured through the configuration of the other concentrators. For example, on sensor line 5', C23 is not the elected master router concentrator (which is C22): the port (e.g. 132) of the interface 13 which enables C23 to communicate with C24, is configured as receiving with the 90% bandwidth and transmitting with the 10% bandwidth. For this purpose, C23 sends for example a signal HD-UP on the aforesaid port.

As far as the elected master router concentrator is concerned, each port of the activated interface connected to the given sensor line is configured as receiving with the higher bandwidth and transmitting with the lower bandwidth. For example, on sensor line 5', C22 is the elected master router concentrator, therefore, the two ports 131,132 of the interface 13 of C22 which enable communication with C21 and C23 are configured for receiving with the 90% bandwidth and transmitting with the 10% bandwidth. For this purpose, C22 sends for example a signal HD-UP on each of the aforesaid two ports 131,132 of the interface 13.

In some embodiments, the second phase 80 for determining a bandwidth orientation for each segment of the sensor

TABLE A

|      | C11 | C12 | C13 | C14 | C15 | C21 | C22 | C23 | C24 | C25 |
|------|-----|-----|-----|-----|-----|-----|-----|-----|-----|-----|
| @BRA | 4   | C11 | C11 | C11 | C11 | C22 | C12 | C22 | C22 | C15 |
| @RA  | C11 | C11 | C11 | C11 | C11 | C22 | C22 | C22 | C22 | C25 |
| @NA  | C12 | C11 | C11 | C11 | C11 | C22 | C25 | C22 | C22 | C22 |
| @CA  | C11 | C11 | C11 | C11 | C11 | C22 | C22 | C22 | C22 | C22 |

It should be noted that above "addresses of the concentrators" of course refer to the address of the interface 13 of said concentrator 3 with the given line 5 for which the method is carried out, a router concentrator 2 in particular having indeed two addresses, one for each line 5,6 (i.e. one for each interface 13,18) to which it is connected.

It should also be noted that the election of a master routing node is preferably carried out for each acquisition line (5,5') of the network (300) even if it could be done only for some lines having more than one router node; the election could also be carried out on backbone lines.

In a preferred embodiment, the first phase 70 (for electing a master routing node) is carried out periodically (including at initialization), with a first period (e.g. 20 ms). Step 73 can also be carried out periodically, with a second period (e.g. 10 line 5,5' does not take place; other phases consecutive to first election phase might occur, wherein the concentrators (nodes) use the result of the first phase 70 (i.e. the address of the master router). As an example, a consecutive phase might e.g. be the transmission data of a specific type, like application data distinct from the seismic data, to the master router concentrator of the given sensor line. For example, on sensor line 5', each of the concentrators C21 and C23, C24 and C25 sends application data to C22 (the master router concentrator).

Figure 6:
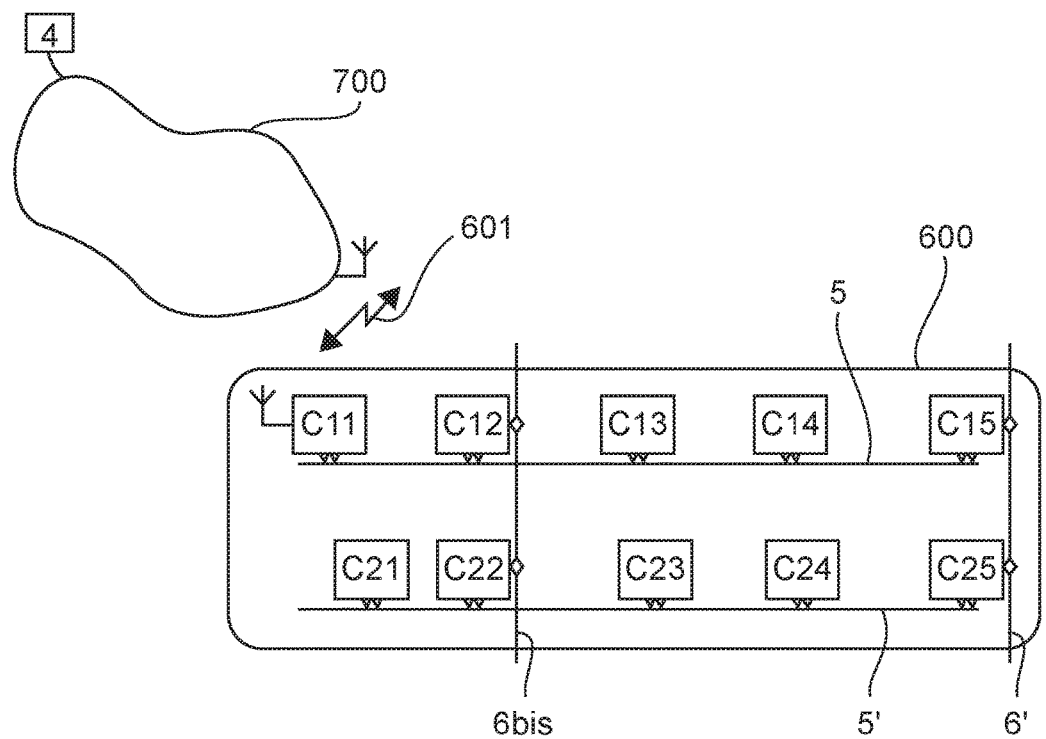
FIG. 6 shows a third example of network with a loop.

FIG. 6 shows a third example of network 600 with a loop, wherein the master central unit 4 belongs to another network 700, to which the network 600 is connected via a radio link 601. The target node of the network 600 is the concentrator C11, which is not a router concentrator: It for example allows to collect data from the other concentrators C12-C15 and C21-C25 of the network 600 and send these data towards the master central unit 4 via the radio link 601.

The below table B shows the results of the steps 71 to 76 of the first phase 70 for electing a master routing node (see FIG. 7), when applied to the concentrators of the network 600. Table B differs from table A in that @BRA of C11 is the address of C11 (because C11 is the target node of the network 600), in that @NA of C12 is the address of C15 (because C15 is the only other router of sensor line 5) and in that @NA of C13-C15 is the address of C12 (because it is the lowest address among the addresses of the routers C12 and C15 of sensor line 5).

TABLE B

|  | C11 | C12 | C13 | C14 | C15 | C21 | C22 | C23 | C24 | C25 |
|---|---|---|---|---|---|---|---|---|---|---|
| @BRA | C11 | C11 | C11 | C11 | C11 | C22 | C12 | C22 | C22 | C15 |
| @RA | C11 | C11 | C11 | C11 | C11 | C22 | C22 | C22 | C22 | C25 |
| @NA | C12 | C15 | C12 | C12 | C12 | C22 | C25 | C22 | C22 | C22 |
| @CA | C11 | C11 | C11 | C11 | C11 | C22 | C22 | C22 | C22 | C22 |

Above method(s) is(are) carried out by elements of the nodes (concentrators): adapted means for performing the different steps are comprised in the processing unit 10 of the node 2,3, like calculators for determining addresses for corresponding steps 71,72,75, selector or comparator for managing election step 76, receptor for listening messages and collecting addresses 74, emitter in the router nodes for sending addresses 73.

Although the present invention has been described with references to the illustrated particular embodiments, it is in no way limited by these embodiments. In particular, all embodiments referring to acquisition lines 5,5' may be transcribed to any other subnet, including backbone lines 6. It might also be envisioned that no router concentrator is present on the subnet 5 (e.g. a network with one subnet), for example the subnet comprising C21, C22, C23 and C24, with no link between C24 and C25 in FIG. 3 and C23 as target node), the concentrators 2,3 and their processing means 10 remaining the same. In which case, the election as described above still may be carried out, with step 73 leads to no sending of message, step 74 leads to no reception, and step 75 leads to the selection of @CA being the simple taking back of @RA: the master routing node is thereby the target node.

The invention claimed is:

1. Method for electing a master routing node of a given subnet of a network, which given subnet comprises nodes connected together by a same type of interface, wherein the nodes comprising at least two activated interfaces enabling a connection with the given subnet and another different subnet of the network are defined as router nodes, one of the nodes of the network being chosen as target node, said method comprising following steps:
   determining a first-type address associated with the interface of each node on the given subnet, said first-type address being the address given by a routing table of the next hop on the path leading from said node to the target node, the next hop being a router node or said target node;
   determining a second-type address associated with the interface of each node on the given subnet, said second-type address being the determined first-type address if the determined first-type address is on said given subnet, or the address of the interface of said node on the given subnet if the determined first-type address is on another subnet of the network than said given subnet;
   sending by each router node of the given subnet a message containing its determined second-type address;
   collecting at the interface of each node on the given subnet said sent messages containing a second-type address associated with a router node of said given subnet;
   selecting for the interface of each node on the given subnet a third-type address among its determined second-type address and the second-type addresses contained in the collected messages, according to a selection rule known by all nodes of said subnet;
   electing as master routing node of said given subnet the node having the selected third-type address.

2. Method for electing a master routing node according to claim 1, wherein the selection rule consists in selecting the lowest or highest address among the second-type addresses.

3. Method for managing a network comprising a plurality of subnets, each subnet comprising nodes connected together by a same type of interface, at least one of said nodes of each subnet being a router node with at least two activated interfaces each enabling a connection with a different subnet, said method comprising a first phase for electing a master routing node of a given subnet being a method according to claim 1.

4. Method for managing a network according to claim 3 wherein said first phase is carried out periodically, with a first period.

5. Method for managing a network according to claim 4, wherein said step of sending a message on the given subnet is carried out periodically, with a second period lower than the first period.

6. Method for managing a network according to claim 3, wherein said first phase for electing a master routing node is carried out on detection of a topology change in the network, by addition, deletion or cut of a link between two nodes.

7. Method for managing a network according to claim 3, wherein said first phase for electing a master routing node is carried out for every subnet of the network which comprises nodes which are not router nodes.

8. Method for managing a network according to claim 3, wherein the network is a seismic data acquisition network whose nodes are concentrators receiving seismic data, wherein the plurality of subnets comprises acquisition lines and backbone lines, and wherein each router node comprises a first activated interface comprising at least one port connected to an acquisition line and a second activated interface comprising at least one port connected to a backbone line.

9. Method for managing a network according to claim 3, wherein each subnet comprises a plurality of segments connected together in series, each segment having a node at least at one of its ends, each segment having asymmetric bandwidths with a higher bandwidth in one direction and a lower bandwidth in the other direction, and wherein said method comprises a second phase for determining a bandwidth orientation for each segment of said given subnet, comprising the configuration of the ports of the activated interface of each node on said given subnet, as a function of the master routing node.

10. Method for managing a network according to claim 9, wherein the configuration of the ports comprises the following steps:
for the master routing node, each port of the activated interface connected to said given subnet, is configured such that the interface of said master routing node on the given subnet is receiving with the higher bandwidth and is transmitting with the lower bandwidth;
for other nodes than the master routing node, each port of the activated interface connected to said given subnet, except the one through which the node can communicate with the master routing node, is configured such that the interface of said node on the given subnet is receiving with the higher bandwidth and is transmitting with the lower bandwidth.

11. A non-transitory computer-readable carrier medium storing a computer program product which, when executed on a computer or a processor, causes the computer or the processor to carry out a method for electing a master routing node of a given subnet of a network, which given subnet comprises nodes connected together by a same type of interface, wherein the nodes comprising at least two activated interfaces enabling a connection with the given subnet and another different subnet of the network are defined as router nodes, one of the nodes of the network being chosen as target node, said method comprising following steps:
determining a first-type address associated with the interface of each node on the given subnet, said first-type address being the address given by a routing table of the next hop on the path leading from said node to the target node, the next hop being a router node or said target node;
determining a second-type address associated with the interface of each node on the given subnet, said second-type address being the determined first-type address if the determined first-type address is on said given subnet, or the address of the interface of said node on the given subnet if the determined first-type address is on another subnet of the network than said given subnet;
sending by each router node of the given subnet a message containing its determined second-type address;
collecting at the interface of each node on the given subnet said sent messages containing a second-type address associated with a router node of given subnet;
selecting for the interface of each node on the given subnet a third-type address among its determined second-type address and the second-type addresses contained in the collected messages, according to a selection rule known by all nodes of said subnet;
electing as master routing node of said given subnet the node having the selected third-type address.

12. Node comprising a processing unit and at least one first interface enabling a connection with a subnet belonging to a network, said subnet comprising a plurality of nodes, said processing unit comprising:
means for determining a first-type address of said first interface through a routing table, said first-type address being the address of the next hop from said node on the path for arriving to a target node of the network;
means for determining a second-type address of said first interface, the second-type address being the determined first-type address if the determined first-type address is on the subnet to which the first interface is connected, or the address of said first interface;
collecting means for listening and collecting at said first interface messages containing a second-type address;
means for selecting a third-type address of said first interface among the second-type address of said interface, and the second-type addresses contained in the messages from the collecting means, according to a selection rule;
electing means for acknowledging as master routing node of the subnet to which the first interface is connected the node having the third-type address.

13. Node according to claim 12 further comprising a second interface enabling a connection with a second subnet belonging to the network, said second subnet being different from the subnet connected through the first interface.

14. Node according to claim 12 further comprising means for sending through the first interface a message containing the determined second-type address.

15. Seismic concentrator comprising a node according to claim 12 wherein the processing unit further comprises means for seismic data acquisition.

16. Seismic concentrator comprising a node according to claim 13 comprising a first interface comprising at least one port which can be connected to an acquisition line of a seismic data acquisition system, and a second interface comprising at least one port connected to a backbone line of said seismic data acquisition system.

17. Seismic acquisition subnet comprising a plurality of seismic concentrators according to claim 15, the first interface of said concentrators being activated and comprising ports connected to a seismic acquisition line.

18. Seismic acquisition system comprising a plurality of seismic acquisition subnets according to claim 17 wherein at least one concentrator comprises a second activated interface such that said concentrator is connected to two different subnets of said network.

* * * * *